(12) United States Patent
Thompson et al.

(10) Patent No.: US 8,533,794 B2
(45) Date of Patent: Sep. 10, 2013

(54) STREAMING CONTENT IN GUEST MODE

(75) Inventors: Kevin Thompson, Salem, OR (US);
Robin F. Hoeye, Canby, OR (US)

(73) Assignee: Seiko Epson Corporation, Tokyo (JP)

(*) Notice: Subject to any disclaimer, the term of this patent is extended or adjusted under 35 U.S.C. 154(b) by 2 days.

(21) Appl. No.: 13/308,447

(22) Filed: Nov. 30, 2011

(65) Prior Publication Data

US 2012/0072974 A1  Mar. 22, 2012

Related U.S. Application Data

(62) Division of application No. 11/969,590, filed on Jan. 4, 2008, now Pat. No. 8,079,067.

(60) Provisional application No. 60/883,720, filed on Jan. 5, 2007.

(51) Int. Cl.
*G06F 7/04* (2006.01)

(52) U.S. Cl.
USPC .......................................................... 726/5

(58) Field of Classification Search
USPC .................... 726/5–7, 27, 29; 713/151, 168; 709/225, 229
See application file for complete search history.

(56) References Cited

U.S. PATENT DOCUMENTS

| | | | |
|---|---|---|---|
| 7,356,510 B2 | 4/2008 | Durand et al. | |
| 7,444,306 B2 | 10/2008 | Varble | |
| 7,620,814 B2 | 11/2009 | Ondet et al. | |
| 2002/0099936 A1* | 7/2002 | Kou et al. | 713/151 |
| 2002/0120607 A1 | 8/2002 | Price et al. | |
| 2003/0014368 A1* | 1/2003 | Leurig et al. | 705/64 |
| 2006/0183463 A1* | 8/2006 | Falk et al. | 455/411 |
| 2008/0022084 A1 | 1/2008 | Raftelis et al. | |
| 2009/0254965 A1 | 10/2009 | Smith et al. | |

* cited by examiner

*Primary Examiner* — Beemnet Dada
(74) *Attorney, Agent, or Firm* — Oliff & Berridge, PLC

(57) ABSTRACT

The present application relates to systems, apparatus and methods for transmitting image data from a content source to an image display in a dual mode system which includes a guest mode and an authorized user mode. One example embodiment comprises establishing a secure connection to a network requiring access credentials, detecting a content source, establishing a non-secure connection to receive image data from the content source, receiving the image data from the content source, and providing the image data to a display, wherein the content source is not provided access over the secure connection.

7 Claims, 4 Drawing Sheets

STREAMING CONTENT IN GUEST MODE

CROSS-REFERENCE TO RELATED APPLICATIONS

This application is a divisional of U.S. patent application Ser. No. 11/969,590, filed Jan. 4, 2008, which claims the benefit of U.S. Provisional Application No. 60/883,720, filed Jan. 5, 2007, the disclosures of which are hereby incorporated by reference in their entirety and for all purposes.

FIELD

The present application relates to systems, apparatus and methods for transmitting image data from a content source to an image display device.

BACKGROUND

Display devices, also referred to herein as information display devices, image devices or image display devices, may be used in a variety of environments. Exemplary display devices include cathode ray tubes (CRTs), flat panel liquid crystal displays (LCDs) systems, LED systems, plasma systems, front projection systems, rear projection systems, LCD monitors, televisions, monitors, and projectors, large format display devices, etc.

Display devices may be adapted to display images, including text, graphics, video images, still images, presentations, etc. Such display devices may be found in home environments and applications, education environments and applications, business facilities, conference rooms and other meeting facilities, etc.

The images or content displayed on a display device may be provided by any of a plurality of different content sources. Example content sources include, but are not limited to, computers, storage mediums, memory devices, cameras, telephones, portable data assistants, etc. Image data from a content source may be transmitted to a display device directly or through a network, over a wired or wireless connection, etc.

Different content sources may include different types of connectors for coupling the content source to the image device. For example, known systems utilize a variety of types of cable technology for transmitting graphic and image data, for example, VESA connectors, Component systems, Composite systems, S-Video systems, M1-DA systems and HDMI systems.

Many home, corporate and education end-users are deploying streaming media solutions to get digital content from a computing device or content source, such as Laptop, PDA, Smartphone, PC, to a large format display device. In corporate and education settings, a receiving device often requires WLAN/LAN infrastructure credentials to logon to a local infrastructure. The inventors herein have recognized that there exists a need for guest users to obtain access to the streaming device architecture while still serving the needs of users with local infrastructure credentials.

SUMMARY

Herein the inventors provide examples, methods, applications, mechanisms, use-models, systems and apparatuses that allow users within a local network infrastructure, as well as guests, to access a streaming device architecture and transfer digital content to a network enabled display device. One example embodiment comprises establishing a secure connection to a network requiring access credentials, detecting a content source, establishing a non-secure connection to receive image data from the content source, receiving the image data from the content source, and providing the image data to a display, wherein the content source is not provided access over the secure connection.

This Summary is provided to introduce a simplified form of concepts that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The examples, methods, applications, mechanisms, use-models, systems and apparatuses disclosed may be applied to various approaches of streaming digital content from a content source to an image device. For example, approaches may include a WLAN approach, a joint WLAN/LAN enabled approach, etc., as explained below in more detail. It should be appreciated that the following transmission system descriptions and corresponding figures provide exemplary environments in which embodiments may be applied. The systems and methods may be adapted for use in other environments without departing from the scope of the disclosure.

Figure 1:
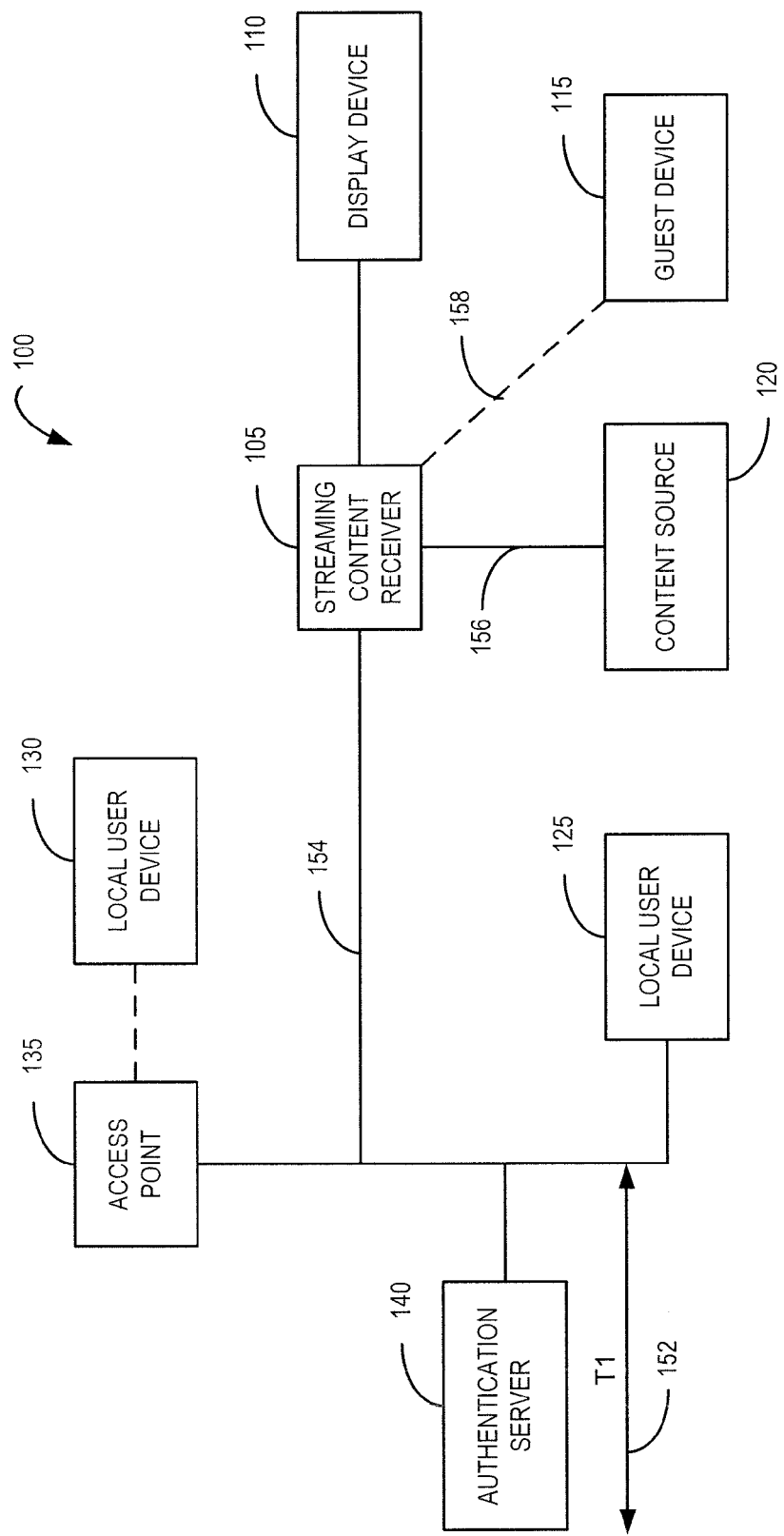
FIG. 1 illustrates a display system that provides a guest user a method to access a streaming device architecture to transfer digital content to a network enabled display while still serving the needs of local users with local infrastructure credentials according to an embodiment of the present disclosure.

FIG. 1 shows an example network 100 with a streaming content receiver 105 that provides guest mode access for a guest device 115 over a non-secure connection 158 (non-secure link, etc.) and also provides access to the display device 110 for other local user devices 125 and 130 through network 154 requiring access credentials, and for a content source 120, as illustrated examples. Network 154 may include other devices in a secure network including authentication server 140, an access point 135 to provide access to a local user device 130 with access privileges, a local user device 125 directly coupled to network 154, to a communications channel such as T1 line 152 that couples a local area network (LAN) to an enterprise network, as examples.

Content sources, such as guest device 115 and local user device 125, may be any suitable content sources, computing devices or image storage device capable of generating or providing image data, such as, but not limited to, computer graphics or video-based image data. For example, a content source may be a computer, a desktop computer, a laptop computer, a server, PDA, a storage medium, such as a memory card and other memory devices, a camera, a telephone, such as a smartphone, a portable data assistants, etc. Moreover, the content source may include a combination of devices, such as a networked computer system, where the content source includes a computer linked through a network, such as a public network, e.g. the Internet, or a private network.

The display device 110 may be any suitable image display device. For example, display device 110 may be a large format display device (LFDD). LFDDs may include, but are not limited to, CRTs, flat panel LCDs, plasma systems, LED systems, front projection systems and rear projection systems. It should be appreciated that although described in regards to transmission to a LFDD, the image transmission system may be used in a variety of environments, including transmission to small format display devices, other display devices, etc.

Referring to example network 100 in FIG. 1, access to network 154 may be managed by authentication server 140. Example authentication servers may provide authentication using the RADIUS Authentication, Authorization, and Accounting protocol; the Kerberos protocol; the TACACS+ protocol, or other services or protocols that manage authentication to access secure resources. Example access credentials may be a username and password, keys, digital credentials, hash functions, or any other suitable sequence of code or bits that may be used to control access, authentication, and security on a network in general. Other examples may include creating a network address through DHCP, or a statically assigned IP address, once a device provides proper access credentials to authentication server 140, as an example.

In some embodiments, streaming content receiver 105 may function as a firewall and restrict access to network 154 or to devices or services coupled with network 154 that requires credentials some credentials to access. In these embodiments, the streaming content receiver 105 may permit or deny access to a secure network, to protected services or devices, etc. Example firewalls include simple MAC filters, a screened subnet firewall such as a demilitarized zone (DMZ), packet filters, stateful filters, application layer filters, network address translation and protected address ranges, a device or service on an access control list, or other suitable firewalls to permit or deny access to a secure network, or to a protected service and/or device.

The embodiment illustrated in FIG. 1 depicts a use-model and a system of including an authorized user mode to provide a mechanism for users within a local network infrastructure, with access credentials for devices on network 154, to transfer digital content to network enabled display device 110 and also provides a method for guests access credentials to use display device 110 without access to network 154.

In one example, a local user device 130 may be an employee computer and that is authenticated using local network credentials through a wireless access point 135, such as a wireless LAN such as 802.11 (a, b, g, n, X), or local user device 125 is authenticated using local network credentials through a direct connection to network 154. In this way, content may be transferred to streaming content receiver 105 via the network, for example a wired LAN connection such as an Ethernet (IEEE 802.3) connection.

To further describe the example, guest device 115 may be a visitor laptop containing presentation materials, wherein content may be transferred to streaming content receiver 105 via a separate WLAN connection such as non-secure connection 158, which does not require local network infrastructure credentials, for example where non-secure connection is part of an ad-hoc network. In the present embodiment, streaming content receiver 105 is external to the display device 110, but other embodiments are not so limited, and embedded streaming content receivers are described in more detail with reference to FIG. 2 and FIG. 3.

Referring to FIG. 1, streaming content receiver 105 is described in more detail for illustration purposes. In some embodiments, streaming content receiver 105 may be configured to establish a secure connection over a first port to at least one device on a network 154 requiring access credentials, and may be configured to establish a non-secure connection 158 to guest device 115, or other content source. Guest device 115 may also have a third port that is coupled with a display device 110.

Additionally, streaming content receiver 105 may also comprise circuitry (not shown), memory, embedded controls, software, etc., that is coupled with the ports or configured to control them, wherein the circuitry, etc., is configured to provide the image data to display device 110 over the third port and restrict the guest device 115 from access to the network 154 if the guest device 115 does not provide the required access credentials. It would be understood by one in the art that a streaming content receiver 105 would comprise circuitry; therefore it is not illustrated or described explicitly in reference to FIG. 1.

In some embodiments, the ports may utilize a common hardware link and therefore may be logically defined ports as opposed to physically defined ports. In some embodiments, the circuitry, etc., may be used to change security settings on guest device 115, such as to approve its access credentials, to provide other limited access credentials such as a default recognized name for an SSID associated with non-secure connection 158 (e.g., "guest"), etc.

In some embodiments, the circuitry, etc., may be used to couple the guest device 115 to control circuitry of display device 110 and to adjust display settings on display device 110. In yet another embodiments, display device 110 may be configured to have different permissions for adjusting device settings, for example, device settings adjusted over network 154 may be more permanent, while a display device 110 setting adjusted by guest device 115 may be only temporary, as an example. In yet another embodiment, the circuitry, etc., in streaming content receiver 105 may be configurable to enable or disable the non-secure connection 158.

Figure 2:
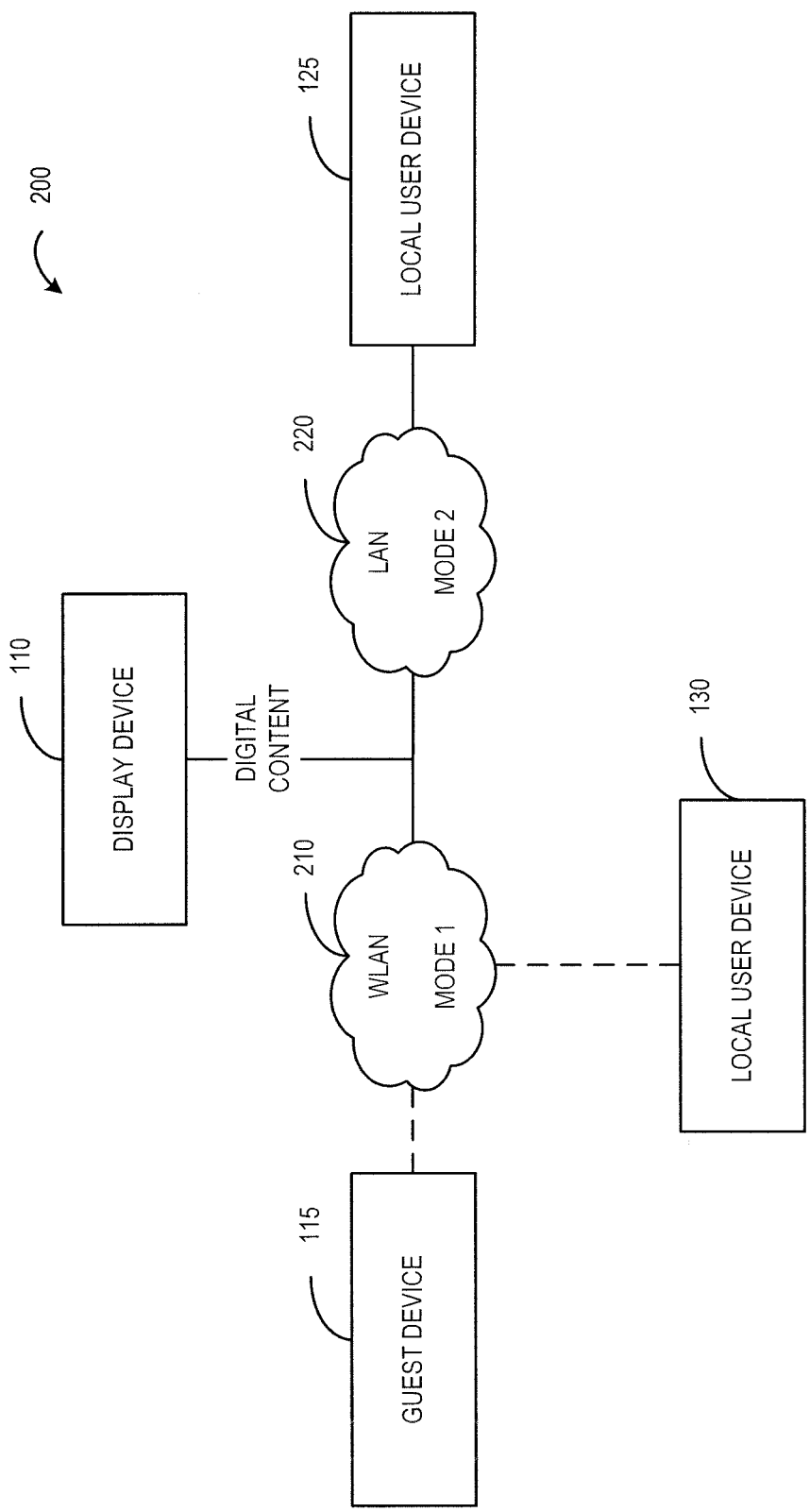
FIG. 2 illustrates another display system that provides a guest user a method to access a streaming device architecture to transfer digital content to a network enabled display while still serving the needs of local users with local infrastructure credentials according to another embodiment of the present disclosure.

FIG. 2 illustrates an exemplary projection system 200 that provides a guest user a method to access a streaming device to transfer digital content to a network enabled display, such as display device 110, while still serving the needs of local users with local infrastructure credentials. The embodiment in FIG. 2 also illustrates an embedded streaming content receiver, such as streaming content receiver 105, wherein the streaming content receiver is embedded in display device 110. FIG. 2 further provides an example system wherein the streaming content receiver is coupled to a wireless LAN 210 operating in a first mode and a wired LAN operating in a second mode.

In an example embodiment, system and methods are disclosed wherein the device architecture that receives streaming digital content has WLAN as a transport mechanism to wirelessly enable transfer of digital content. Special considerations are given to the WLAN configuration to allow "guest mode" availability when a streaming digital content receiver is configured for local infrastructure credentials.

In another example embodiment, a system and method is disclosed wherein the device architecture implements both WLAN and LAN mechanisms for receiving digital content over a WLAN or LAN architecture. The WLAN may be reserved for "Guest Mode" with appropriate settings to serve users without obtaining local infrastructure credentials. The LAN may be reserved for users within the domain of local infrastructure credentials.

According to an embodiment, projection system 200 may include a display device 110, a guest device 115, a WLAN 210 in a guest mode (Mode 1), a LAN 220 in local user mode (Mode 2), and a local user device 125. Local user mode may also be considered an authorized user mode, etc. Local users may be authorized users and have priority access to the system. The guest device 115 may be operatively coupled to the WLAN 210 in guest mode, which may be operatively coupled to the display device 110.

In the present embodiment, guest device 115 and local user device 125 may be content sources. In FIG. 2, local user device 125 may be operatively coupled to the LAN 220 in local user mode, which may be operatively coupled to the display device 110. In some embodiments, the WLAN in guest mode may communicate with the LAN in local user mode 220. In some embodiments the WLAN in guest mode 210 may be operatively coupled to another local user device 130.

As described in more detail above with reference to the embodiment in FIG. 1, the projection system 200 provides an improved use-mode for a user, allowing a guest user who does not have local infrastructure credential to access and transfer digital content wirelessly to a streaming digital content receiver such as a display device 110 while stilling serving the need (e.g. security need) of local users with local infrastructure credentials.

Figure 3:
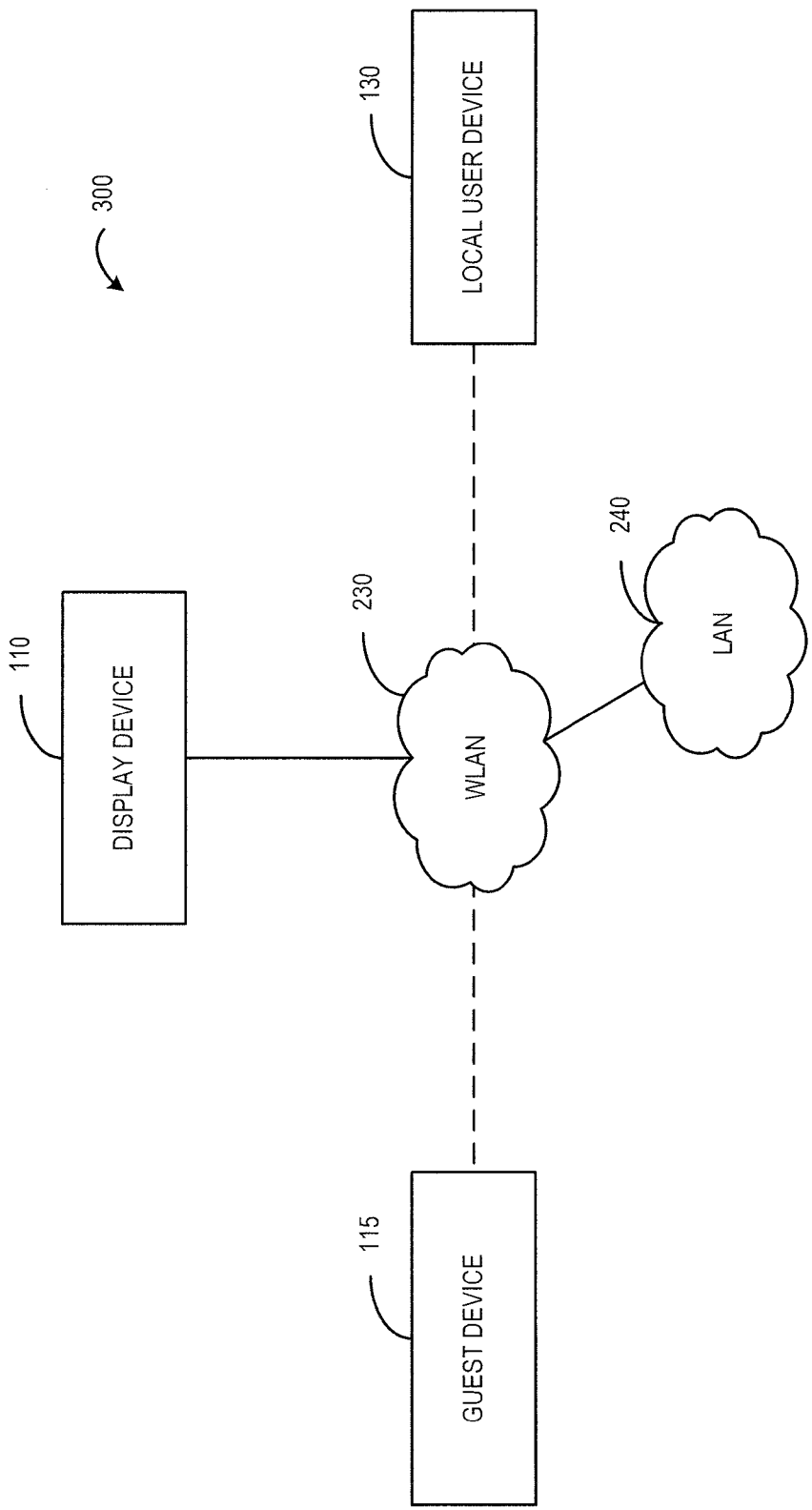
FIG. 3 illustrates yet another display system that provides a guest user a method to access a streaming device architecture to transfer digital content to a network enabled display while still serving the needs of local users with local infrastructure credentials according to yet another embodiment of the present disclosure.

FIG. 3 shows a schematic depiction another exemplary projection system 300 according to an embodiment of the current disclosure. The embodiment in FIG. 3 also illustrates an embedded streaming content receiver, such as streaming content receiver 105, wherein the streaming content receiver is embedded in display device 110.

In an example embodiment, system and methods are disclosed wherein the device architecture that receives streaming digital content has WLAN as a transport mechanism to wirelessly enable transfer of digital content. Special considerations are given to the WLAN configuration to allow "guest mode" availability when a streaming digital content receiver is configured for local infrastructure credentials.

The system 300 may include a display device 110 operatively linked to content sources, which include a guest device 115 and an local user device 130, via a WLAN 230. In some embodiments the WLAN 230 may be also operatively linked to a LAN 240. Digital content may be streamed from the content sources to the display device 110 via networks 230 and 240. System 300 may also embody aspects described above with reference to FIG. 1 and FIG. 2, and aspects related to the methods described with reference to the flow diagram in FIG. 4.

Figure 4:
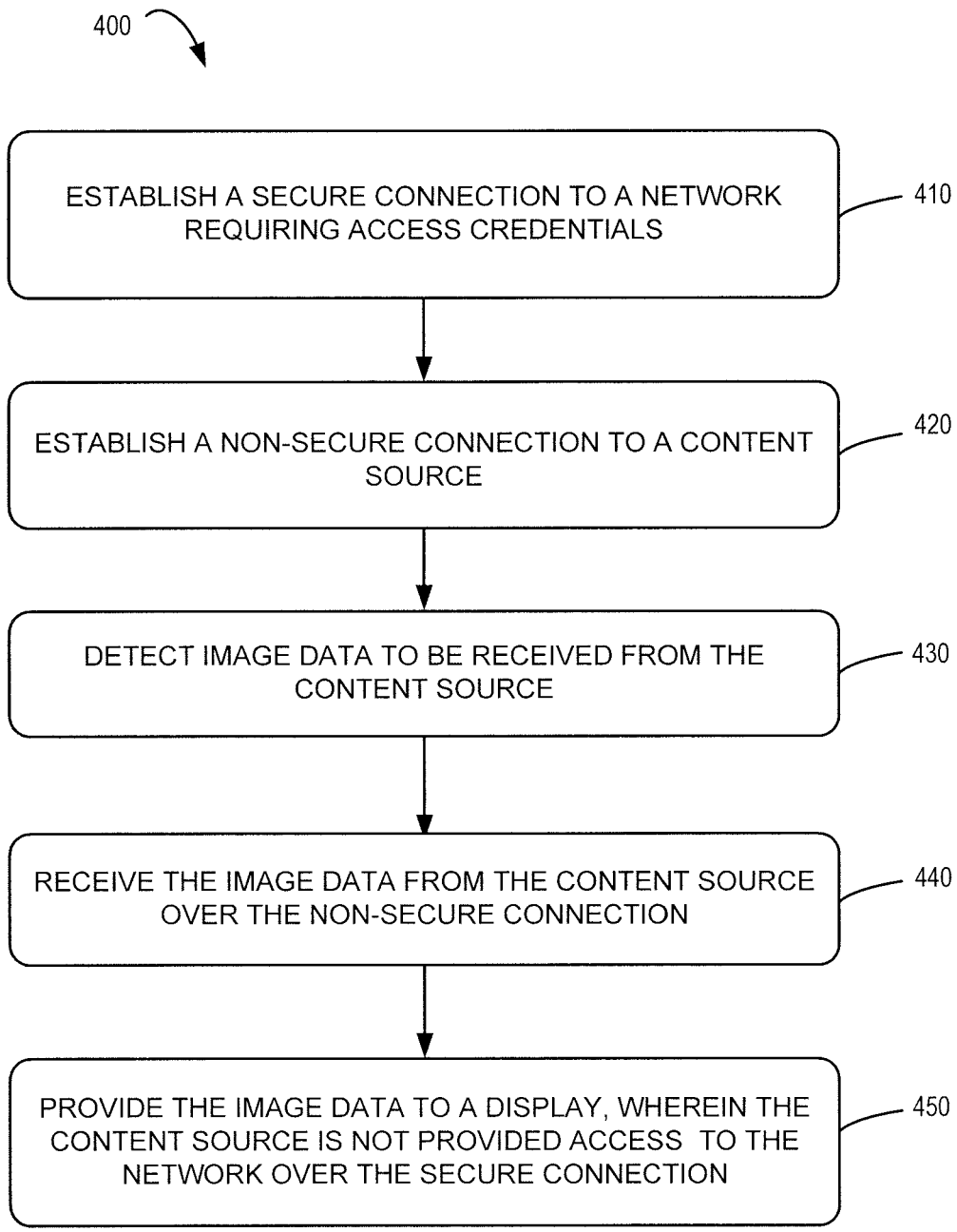
FIG. 4 is a flow diagram illustrating a method of practicing an embodiment according to the present disclosure.

FIG. 4 is a flow diagram illustrating a method 400 of practicing an embodiment according to the present disclosure. In block 410, method 400 may establish a secure connection to a network requiring access credentials. In some embodiments, instead of establishing the secure connection a device may be configurable to establish a secure connection to a network requiring access credentials. Additionally, in some embodiments a secure connection may be established at some previous time and then later become inoperable, yet the remaining steps of method 400 may still be practiced according to the flow diagram in FIG. 4.

Next, in block 420, method 400 may establish a non-secure connection to a content source. In some embodiments, the content source may be a guest device 115 as described above, or other content sources within the principles of this disclosure or their equivalents. In block 430, the method then detects image data to be received from the content source, and in block 440 receives the image data from the content source over the non-secure connection. In some embodiments the non-secure connection may be a wireless network connection, a wired connection, or other connection as explained with reference to embodiments within this description.

Finally, in block 450, the method may provide the image data to a display, such as display device 110, wherein the content source is not provided access to the network over the secure connection. In some embodiments, the image data may be provide to a device in communication with a display, in this way the image data may be networked to the display while not providing the access to a content source to the network over the secure connection.

In some embodiments, the secure connection is established over a wired local area network and the non-secure connection is established over a wireless local area network, but other embodiments are not so limited. For example, the secure connection may be over a first wireless local area network and the non-secure connection may be over a second wireless local area network, or in another embodiment the same wireless local area network may be used but access privileges may differ based on a certain device or resource.

In another embodiment, a security setting may be provided to the content source over the non-secure connection, wherein the security setting does not provide access to the network requiring access credentials. In this manner, a network administrator can create limited access privileges to a display device, or alternatively may enable users with a default logon procedure to simplify providing image data to the display device over the non-secure connection.

As described with reference to the functionality explained above in FIGS. 1-3, method 400 may further include allowing a content source to adjust display settings over the non-secure connection, or even further including an adjustable setting to allow enabling and disabling of the method 400 itself. In some embodiments, a method may further include allowing a content source to share a display with a device using the display through the secure connection. These example methods are for illustration purposes, other variations, sequences, functionality, etc. may be provided within the principles of this disclosure, and therefore these enumerated methods are presented as non-limiting examples.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

What is claimed is:

1. An apparatus to receive image data from a content source over a non-secure link, the apparatus comprising:

a first port, wherein the apparatus is configured to establish a secure connection over the first port to at least one device on a network requiring access credentials;

a second port, wherein the apparatus is configured to establish a non-secure connection to a content source over the second port, the non-secure connection to receive image data from the content source; and circuitry coupled to the first port, the second port, and a third port, wherein the circuitry is configured to:
- allow the content source to adjust display settings of the apparatus over the non-secure connection;
- provide the image data to a display over the third port; and
- restrict the content source from access to the network through the secure connection when the content source does not provide the required access credentials.

2. The apparatus of claim 1, wherein the first port is connected with a wired local area network and the second port is connected with a wireless local area network.

3. The apparatus of claim 1, further comprising the display.

4. The apparatus of claim 1, wherein the circuitry is further configured to provide a security setting to the second port, wherein the security setting does not provide access over the secure connection to the network.

5. The apparatus of claim 1, wherein the first port is connected with a first wireless local area network and the second port is connected with a second wireless local area network.

6. The apparatus of claim 1, wherein the circuitry is further configured to provide an adjustable setting to enable and disable the non-secure connection.

7. An apparatus to receive image data from a content source over a non-secure link, the apparatus comprising:

a first means for establishing a secure connection over the first means to at least one device on a network requiring access credentials;

a second means for establishing a non-secure connection to a content source over the second means, the non-secure connection to receive image data from the content source; and means for coupling to the first means, the second means, and a third means to establish connection to a display, wherein the means for coupling is configured to:
- allow the content source to adjust display settings of the apparatus over the non-secure connection;
- provide the image data to the display over the third means; and
- restrict the content source from access to the network through the secure connection when the content source does not provide the required access credentials.

* * * * *